United States Patent
Schmid

(10) Patent No.: US 10,803,644 B2
(45) Date of Patent: Oct. 13, 2020

(54) SAFETY SYSTEM

(71) Applicant: Euchner GmbH + Co. KG, Leinfelden-Echterdingen (DE)

(72) Inventor: Dominik Schmid, Grossbettlingen (DE)

(73) Assignee: Euchner GmbH + Co. KG, Leinfelden-Echterdingen (DE)

(*) Notice: Subject to any disclaimer, the term of this patent is extended or adjusted under 35 U.S.C. 154(b) by 0 days.

(21) Appl. No.: 16/177,472

(22) Filed: Nov. 1, 2018

(65) Prior Publication Data
US 2019/0164324 A1 May 30, 2019

(30) Foreign Application Priority Data

Nov. 27, 2017 (EP) .................................. 17203902

(51) Int. Cl.
| | |
|---|---|
| *G09G 5/00* | (2006.01) |
| *G06T 11/60* | (2006.01) |
| *G06K 7/10* | (2006.01) |
| *G06F 3/01* | (2006.01) |
| *G06K 7/14* | (2006.01) |
| *G02B 27/01* | (2006.01) |
| *G07C 9/00* | (2020.01) |

(52) U.S. Cl.
CPC .............. *G06T 11/60* (2013.01); *G06F 3/011* (2013.01); *G06F 3/017* (2013.01); *G06K 7/10722* (2013.01); *G06K 7/1413* (2013.01); *G06K 7/1417* (2013.01); *G02B 2027/014* (2013.01); *G02B 2027/0138* (2013.01); *G02B 2027/0178* (2013.01); *G02B 2027/0187* (2013.01); *G07C 9/00174* (2013.01)

(58) Field of Classification Search
CPC ....... G06T 19/006; G06T 19/00; G06F 3/011; G06F 3/012; G02B 27/017
USPC .......................................................... 345/633
See application file for complete search history.

(56) References Cited

U.S. PATENT DOCUMENTS

| | | | | |
|---|---|---|---|---|
| 2002/0121406 | A1* | 9/2002 | Summers | E06C 9/04 182/92 |
| 2016/0180678 | A1* | 6/2016 | Ackley | H04M 1/72541 340/7.2 |
| 2017/0358141 | A1* | 12/2017 | Stafford | G06F 3/0482 |

* cited by examiner

*Primary Examiner* — Gordon G Liu
(74) *Attorney, Agent, or Firm* — Michael Soderman

(57) ABSTRACT

A safety system having at least one safety module, which is associated with a system controlled by a controller. A portable augmented reality unit is provided. The augmented reality unit has a camera and a projection unit. The safety module has a connection module. The connection module is designed to provide a data connection with the augmented reality unit, and further, a data connection with the controller. By means of the augmented reality unit, a code identifying the system is captured and transmitted to the connection module. Depending on the code captured by the augmented reality unit, parameters of operating elements are supplied. Based on the parameters, the operating elements are made visible by means of the projection unit of the augmented reality unit.

15 Claims, 2 Drawing Sheets

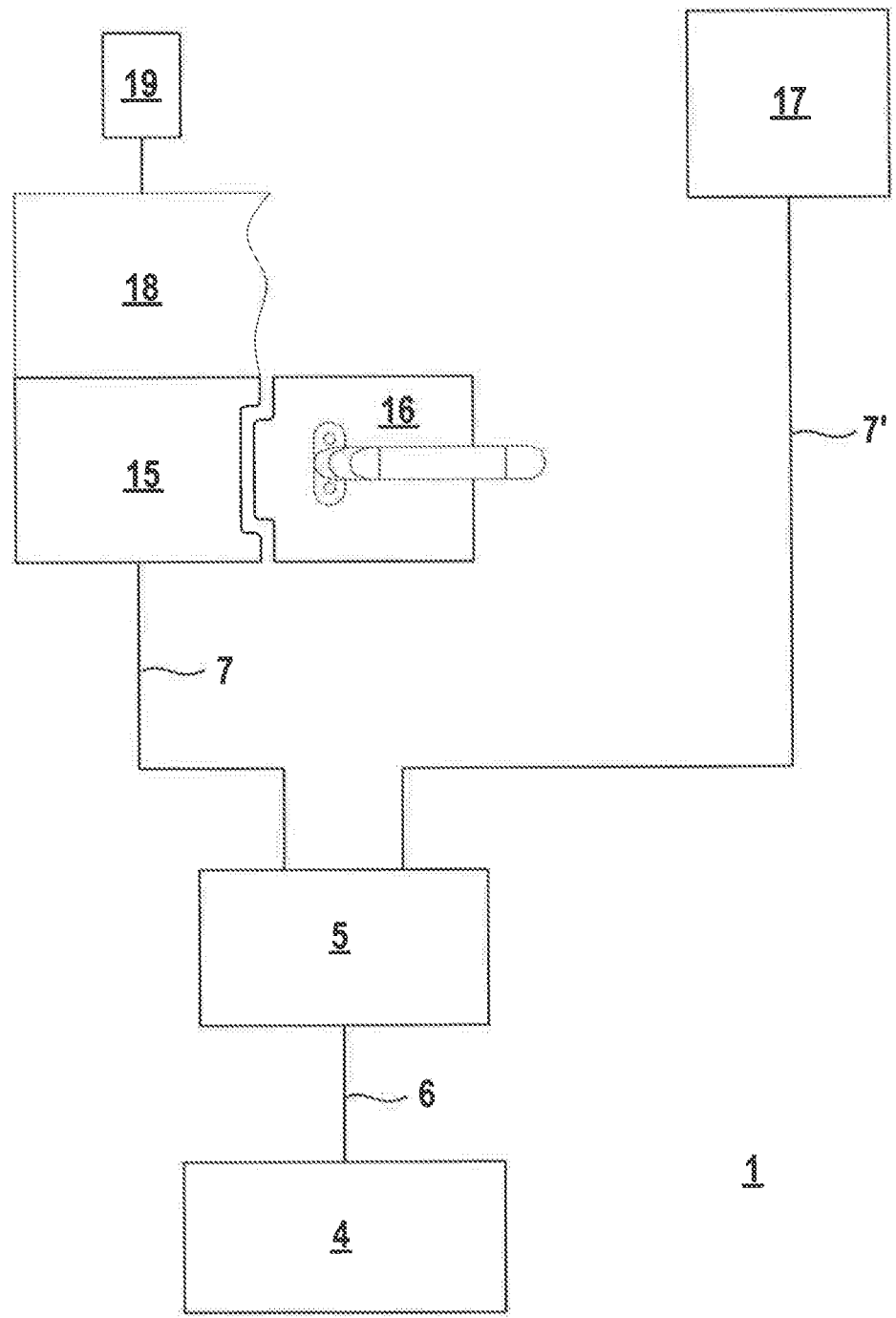

SAFETY SYSTEM

CROSS REFERENCE TO RELATED APPLICATIONS

This application claims the priority of EP 17203902.6 filed on 2017 Nov. 27; this application is incorporated by reference herein in its entirety.

BACKGROUND

The invention relates to a safety system.

Such a safety system is generally used for providing safety functions for a system. The term system generally also comprises parts of systems or units associated with systems. Here, a system may, in particular, also be a machine or a device. Generally, a hazard may arise from such a system. By means of the safety system, the system is protected in such a manner that, in particular, personal injuries will be securely prevented during the operation of the system.

One example of such a safety system is a safety guard locking system. The safety guard locking system generally secures the access to a system. The system can, e.g., be surrounded by fencing, with a separating guard device, such as a safety door, being provided in the fencing. The safety door will be securely locked by the safety guard locking system so that during the operation of the system that may present a hazard for persons, access to the system through the safety door is not possible. The locking of the safety door effected by means of the safety guard locking system will only be released when the system is at a standstill or running in an operating mode in which hazards do not arise from the system.

The operation of the system is generally secured by a controller that can consist of one or several processor units, depending on the design.

For setting process parameters of the system, operating elements are typically associated with the controller. The operating elements may be constituted by keys, rotary knobs, and other means for setting.

SUMMARY

The invention relates to a safety system (1) having at least one safety module (2), which is associated with a system (3) controlled by a controller (4). A portable augmented reality unit (8) is provided. The augmented reality unit (8) has a camera (9) and a projection unit (10). The safety module (2) has a connection module (11). The connection module (11) is designed to provide a data connection (12) with the augmented reality unit (8), and further, a data connection (6, 7) with the controller (4). By means of the augmented reality unit (8), a code identifying the system (3) is captured and transmitted to the connection module (11). Depending on the code captured by the augmented reality unit (8), parameters of operating elements are supplied. Based on the parameters, the operating elements are made visible by means of the projection unit (10) of the augmented reality unit (8).

DETAILED DESCRIPTION

The invention is based on the problem of providing a safety system having a high level of functionality and user friendliness.

The invention relates to a safety system having at least one safety module. The safety module is associated with a system controlled by a controller. What is provided for is a portable augmented reality unit. The augmented reality unit has a camera and a projection unit. The safety module has a connection module. The connection module is designed to provide a data connection to the augmented reality unit and furthermore, a data connection to the controller. By means of the augmented reality unit, a code identifying the system is captured and transmitted to the connection module. Dependent on the captured code of the augmented reality unit, parameters from operating elements are supplied. Based on the parameters, the operating elements are visualized by means of the projection unit of the augmented reality unit. Actuations of the virtual operating elements are captured by means of the augmented reality unit, and actuation data are generated from them. Transmission of the actuation data to the controller is performed via the connection module. In the safety system, settings are automatically performed depending on the actuation data.

Thus, according to the invention, a system and a method are provided that allow user-friendly setting of parameters of the safety system.

For this setting process, according to the invention, an augmented reality unit and a connection module provided in or on the safety module are provided.

The augmented reality unit forms a unit that is wearable by a user, i.e., the user can carry the augmented reality unit with him and can thus flexibly perform setting of process parameters of systems or of parts of systems by means of the augmented reality unit.

Generally, the user wears the augmented reality unit on his head so that he can see an image of the surroundings through the augmented reality unit. Into this image of the surroundings, virtual information can be inserted, which the user can use for setting the process parameters. In particular, the augmented reality unit can be designed in the form of data goggles. Furthermore, the augmented reality unit can be designed in the form of eye tabs, contact lenses, and the like.

By means of the augmented reality unit, a comfortable user interface is created that renders the hitherto required hardware for forming operating elements of the safety system redundant.

As this obviates complex hardware of operating elements in the safety system, a significant cost advantage of the overall system results. In addition, variants of the overall system can thus also be easily modified, or even be obviated.

In particular, the construction of the safety-relevant components of the safety systems becomes simpler. While in known safety systems, safety modules with operating elements such as keys had to be provided, this expense is eliminated in the safety system according to the invention.

Such operating elements have, if they are embodied as non-capacitive operating elements, a limited lifespan. Operating elements in the form of capacitive elements can, however, only be handled with difficulty and while using tools such as special gloves.

As such operating elements are not needed in the safety system according to the invention, the lifespan of the safety system, and also the ease of operation, are increased significantly.

The representation of virtual operating elements generated by means of the augmented reality unit is used by the user for setting process parameters, with the actuation data generated thus being forwarded to the system's controller in order to perform corresponding settings there. Thus a completely equivalent setting process will be realized as it would be performed when using real operating elements, such as keys on the safety module. This means that operating elements provided in hardware on the safety module can be replaced completely and equivalently with the virtual operating elements generated by the augmented reality unit.

It is further advantageous that, for the setting of process parameters according to the invention, already existing components of the safety system that serve, in particular, for communicating with the controller, can also be used, thus achieving another streamlining effect.

The augmented reality unit has, as essential components, a camera and a projection unit. In addition, the augmented reality unit has means for establishing a data connection with the connection module. Generally, wireless data transmission is performed between the connection module and the augmented reality unit. Preferably, the data connection is embodied in the form of a WLAN connection, Bluetooth connection, or the like.

In a first step, by means of the augmented reality unit, the respective system is identified such that a code identifying the system is captured with the camera. As the user wearing the augmented reality unit sees an image of the surroundings through the augmented reality unit, he can easily find the code. The code, which is visible in the image of the surroundings and is thus also within the camera's field of view, is then recorded and decoded by means of the camera. The code may be constituted of, e.g., a QR code, matrix code, or barcode.

The decoded code is transmitted by the augmented reality unit to the connection module, and preferably saved there.

As, by capturing the code, the system or the connection module is identified, parameters matching this system are sent from the operating element of the safety system to the augmented reality unit.

Generally, these parameters can be stored in the connection module. Particularly advantageously, the connection module has an interface with an external unit so that the parameters are read in from the external unit. In both cases, the augmented reality unit then receives the parameters from the connection module. Here, the interface can be implemented as an internet connection. In principle, even the augmented reality unit could have such an interface so that the parameters are directly transmitted from the external unit to the augmented reality unit.

Based on the parameters, the projection unit of the augmented reality unit then generates an image of operating elements, which is inserted into the image of the surroundings of the augmented reality unit. Thus a display of virtual operating elements visible to the user is formed.

The user can then, e.g., by means of a gesture control unit, actuate the virtual operating elements, which is recorded and analyzed in the augmented reality unit. This generates actuation data that are transmitted via the safety module to the controller so that corresponding settings can be performed.

The safety system, in particular its safety module, thus need no longer be equipped with hardware operating elements in order to perform, based on the manual actuation of such operating elements, settings of the safety system, in particular in the controller of the system. Instead, the hardware of operating elements of this kind on components of the safety systems is replaced by a virtual setting via the augmented reality unit.

The communication of the safety module(s) is generally performed via a bus module that is an integral part of the safety system. Via the bus module, a data connection is established between the connection module and the controller.

For the data transmission via this data connection, an ID identifying the safety system is stored in the connection module; said ID can be verified against the controller.

Here, in the connection module, the ID is associated with the code read by the augmented reality unit.

Thus, the connection module constitutes a link between the augmented reality unit on one end, and the controller on the other.

In particular, in the bus module, a data protocol of the connection module for communicating with the augmented reality unit is converted into a data protocol for communicating with the controller.

For this data transfer from the augmented reality unit via the connection module to the controller, the association of the ID with the code detected by the augmented reality unit is used.

Generally, the association of the ID with the code can also be used for additional, more detailed identification of the safety system with the system.

In the simplest case, the code captured with the augmented reality unit is sufficient for identifying the system and for determining the parameters for operating elements for setting process parameters associated with said system. In the case where different safety components of the safety system can be associated with the system in such a manner that different embodiments of operating elements are possible, the code is used together with the ID in order to transmit the operating element parameters matching the corresponding safety system from the connection module to the augmented reality unit so that the corresponding virtual operating elements can then be visualized with the augmented reality unit.

According to an advantageous embodiment, the connection module constitutes a sub-module of a safety module.

This sub-module thus constitutes a component of a safety module and can thus be integrated into the safety system.

Particularly advantageously, the connection module is connectable to the safety module.

In particular, the connection module can be plugged onto the safety module, whereby the connection module automatically establishes electrical contact with the safety module.

According to an advantageous design, the safety system is a safety guard locking system.

BRIEF DESCRIPTION OF THE DRAWINGS

The invention is explained below based on the drawings. They show the following:

FIG. 2: a schematic view of a safety system in the form a safety guard locking system.

DETAILED DESCRIPTION OF THE PREFERRED EMBODIMENTS

Figure 1:
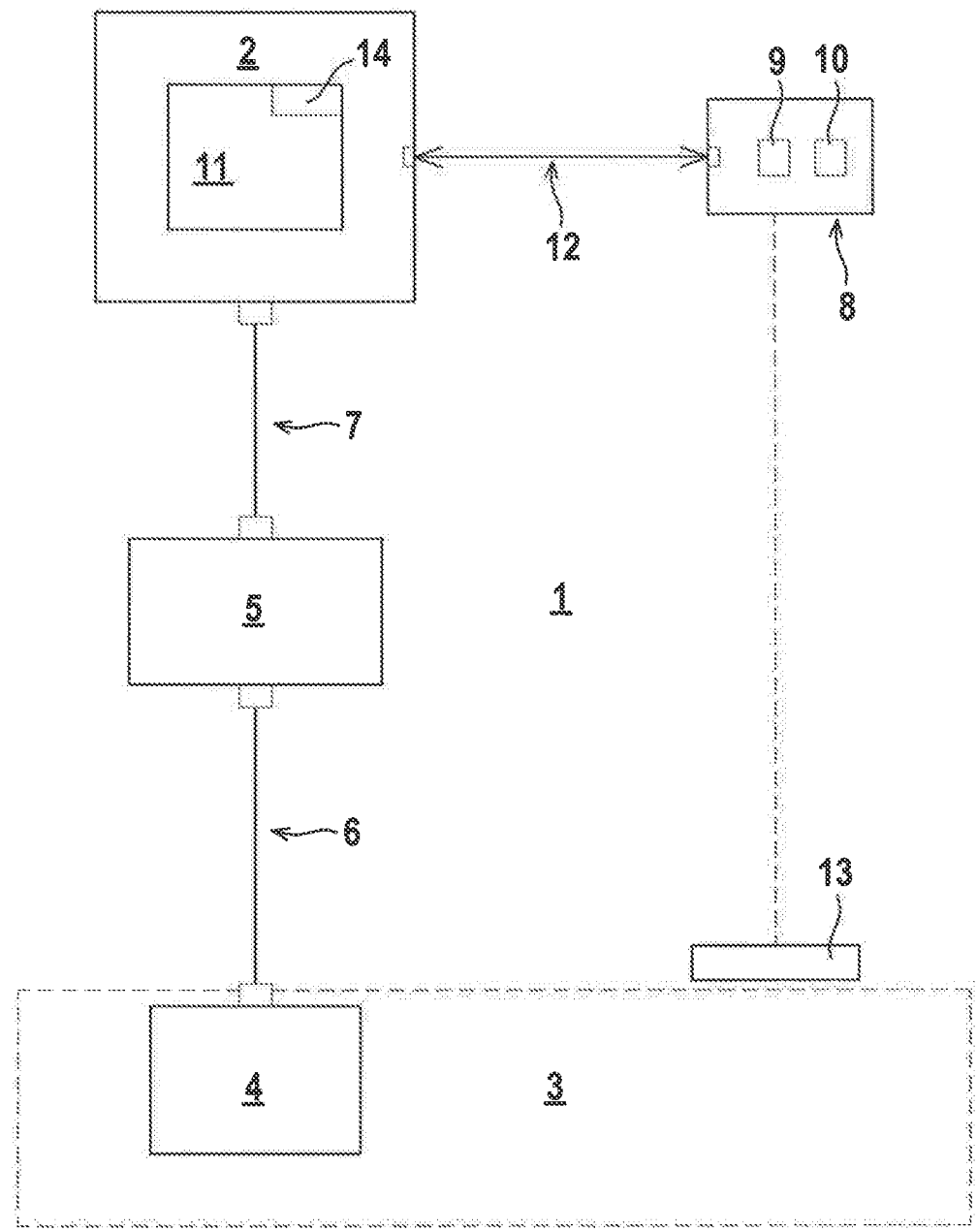
FIG. 1: a schematic view of an exemplary embodiment of the safety system according to the invention.

FIG. 1 shows schematically an exemplary embodiment of the safety system 1 according to the invention. The safety system 1 has a safety module 2 by means of which a safety function is provided for a system 3, which is controlled by a controller 4. The term system 3 comprises generally also machines or automated devices. The controller 4 can, e.g., be constituted by a PLC.

In the embodiment shown in FIG. 1, the safety system 1 comprises a safety module 2. Generally, also several safety modules 2 can be provided. The safety functions performed by the safety module(s) 2 are typically monitoring functions, by means of which it is ensured that the system 3 does not pose hazards for persons.

The safety system 1 further comprises a bus module 5, via which data exchange between the safety module 2 and the controller 4 takes place.

Between the module 5 and the controller 4, a data connection 6 is provided, which in the present case is constituted by an Ethernet connection.

Between the bus module 5 and the safety module 2, another data connection 7 is provided.

Generally, different data protocols are used for the data transmissions via data connections 6, 7 between the safety module 2 and the bus module 5 on one end, and the bus module 5 and the controller 4 on the other. The bus module 5 then provides for conversion of these data protocols, so that data exchange between safety module 2 and controller 4 via the bus module 5 is possible. For identifying the safety module 2, an ID is provided that is stored both in the safety module 2 and also in the controller 4, and which is used for communication between the safety module 2 and the controller 4.

For setting process parameters, operating elements such as keys and the like need not be provided on the safety module 2. According to the invention, instead of such operating elements, an augmented reality unit 8 is provided, which is embodied in the form of data goggles or the like and is wearable by a user. In the augmented reality unit 8, a camera 9 and a projection unit 10 are integrated.

The user wearing the augmented reality unit 8 sees an image of the surroundings into which information can be inserted by means of the projection unit 10, i.e., a virtual, visible image is superimposed on the real image of the surroundings.

The safety module 2 has a connection module 11. The connection module 11 constitutes a sub-module of the safety module 2 and can be plugged onto the latter, whereby electrical contact is automatically established between the connection module 11 and the safety module 2.

Between the connection module 11 and the augmented reality unit 8, a non-contact data connection 12 in the form of a WLAN connection, Bluetooth connection or the like is automatically established, where the required means of data transmission for this purpose are integrated both in the connection module 11 and also in the augmented reality unit 8.

According to the invention, by means of the augmented reality unit 8 and of the connection module 11, process parameter setting for safety system 1 is performed.

For this purpose, first, a QR code 13 attached to the system 3 is captured with the camera 9 of the augmented reality unit 8. Instead of a QR code 13, a matrix code, a barcode, or the like can also be provided.

The code contained in the QR code 13, i.e., its code information, is transmitted by the augmented reality unit 8 to the connection module 11. In the connection module 11, the code is stored together with the ID identifying the safety system 1 so that an association between these elements is established.

Based on the code and the ID, the system 3 and also the safety components constituting the safety system 1 are identified.

Based on the code and the ID, parameters matching the system 3 for operating elements, which are, in particular, associated with the safety module(s) 2, are transmitted from the connection module 11 to the augmented reality unit 8. In principle, these parameters can be stored in the connection module 11 itself. Particularly advantageously, the connection module 11 has an interface 14 for connecting to an external unit, where these parameters are stored. Once the code of the system 3 is known in the connection module 11, the connection module 11 can read in the parameters from the external unit via the interface 14. The interface 14 can, in particular, be embodied as an Internet connection.

Based on the parameters of operating elements transmitted from the connection module 11 to the augmented reality unit 8, the projection unit 10 of the augmented reality unit 8 is used to generate a virtual image of the operating elements, which is superimposed on the image of the surroundings the user sees through the augmented reality unit 8. Thus the user sees virtual operating elements in the surroundings. These virtual operating elements can be embodied in the form of keys, rotary knobs, or the like. The virtual operating elements can be operated by the user, in particular, by means of a gesture control unit. For example, the user puts a finger on an operating element in the form of a key. The camera 9 of the augmented reality unit 8 captures this, and the augmented reality unit 8 interprets this as operation of the operating element, in particular, as pressing the key.

As the parameters of the operating elements are stored in the augmented reality unit 8, corresponding actuation data are generated in said unit by the recorded actuation, i.e., exactly the same actuation data are generated as if a user had actuated a real, hardware operating element provided on a safety module 2.

These actuation data are sent to the connection module 11 by the augmented reality unit 8. The connection module 11 sends the actuation data via the bus module 5 to the controller 4. In doing so, the association between code and ID is used in the connection module 11 in order to then send the actuation data to the controller 4 under the ID via the bus module 5, in order to then perform setting of process parameters according to the actuation data, i.e., according to the actuation of the virtual operating elements generated by means of the augmented reality unit 8.

FIG. 2 shows the safety components of a safety system 1 in the form of a safety guard locking system. The safety guard locking system is used to securely lock a separating guard device such as a safety door. The safety door is, e.g., integrated into fencing that surrounds a hazard area of this system 3. Thus a person can get to the system 3 only through the safety door.

During operation in which hazards for persons can arise from the system 3, the safety door is locked by means of the safety guard locking system so that access to the hazardous area is not possible. Only when the system 3 is at a standstill or when it is running in an operating mode in which no hazards for persons arise from the system 3, the lock of the safety door is released by the safety guard locking system and access to the hazardous area through the safety door is allowed.

The safety guard locking system according to FIG. 2 comprises a base module 15 and a handle module 16. The handle module 16 is arranged on the safety door. The base module 15 is arranged on a frame surrounding the safety door.

Advantageously, the virtual operating elements are made visible by means of the projection unit 10 of the augmented reality unit 8 in the area of the base module 15 or in its vicinity.

When the safety door is in its locked position, the handle module 16 rests against the base module 15 as shown in FIG. 2. The base module 15 contains means for locking by means of which locking can be effected, i.e., secure holding of the handle module 16 in the locked position shown in FIG. 2.

The base module 15 is connected to the bus module 5 via the data connection 6, with the bus module 5 itself being connected to the controller 4 of the system 3 via the data connection 7.

The safety guard locking system further comprises an expansion module 17, which forms a safety I/O module, i.e., a safe module for providing inputs and outputs. The expansion module 17 is connected to the bus module via a data connection T.

Further, the safety guard locking system comprises an expansion module 18 connected to base module 15; said expansion module is used for connecting peripheral units such as signal transducers 19. The expansion module 18 is optional, i.e., providing it in the safety guard locking system is not mandatory.

The connection module 11, which is not shown in FIG. 2, can be attached as a sub-module either to the base module 15 or to the expansion module 17.

In principle, the safety system 1 according to FIG. 2 can also be operated without the base module 15 and the handle module 16 so that only the expansion module 17 is provided, to which the connection module 11 is then attached. Then, the safety system 1 does not constitute a safety guard locking system, but instead, a safety I/O system.

LIST OF REFERENCE NUMERALS (1) safety system
(2) safety module
(3) system
(4) controller
(5) bus module
(6) data connection
(7) data connection
(7') data connection
(8) augmented reality unit
(9) camera
(10) projection unit
(11) connection module
(12) non-contact data connection
(13) QR code
(14) interface
(15) base module
(16) handle module
(17) expansion module
(18) expansion module
(19) transducer

The invention claimed is:

1. A safety system (1) with at least one safety module (2) that is assigned to a system (3) controlled by a controller (4), said system posing hazards, wherein the system (3) is protected in such a manner that a safety function is provided with the safety module (2) that securely prevents personal injuries during the operation of the system (3), comprising a portable augmented reality unit (8), which has a camera (9) and a projection unit (10), said safety module (2) having a connection module (11) that is embodied to provide a data connection (12) to the augmented reality unit (8), and further to provide a data connection (6, 7) to the controller (4), wherein by means of the augmented reality unit (8) a code identifying the system (3) is captured and transmitted to the connection module (11), wherein depending on the code captured, parameters of operating elements are supplied to the augmented reality unit (8), and wherein based on the parameters, the operating elements are made visible by means of the projection unit (10) of the augmented reality unit (8).

2. The safety system (1) according to claim 1, characterized in that actuations of the virtual operating elements are captured by means of the augmented reality unit (8) and actuation data are generated from the actuations.

3. The safety system (1) according to claim 1, characterized in that transmission of the actuation data is performed via the connection module (11) to the controller (4), whereby settings are automatically performed in the safety system (1) depending on the actuation data, and that the safety system (1) has a bus module (5), via which a data connection (6, 7) is established between the connection module (11) and the controller (4).

4. The safety system (1) according to claim 3, characterized in that in the bus module (5), a data protocol of the connection module (11) for communicating with the augmented reality unit (8) is converted into a data protocol for communicating with the controller (4).

5. The safety system (1) according to claim 1, characterized in that in the connection module (11), an ID identifying the safety system (1) is stored, which can be verified against the controller (4).

6. The safety system (1) according to claim 5, characterized in that in the connection module (11), the ID is associated with the code read by the augmented reality unit (8).

7. The safety system (1) according to claim 1, characterized in that the system (3) is identifiable based on a QR code (13), a matrix code, or a barcode.

8. The safety system (1) according to claim 1, characterized in that the parameters of the operating elements are transmitted by the connection module (11) or an external unit to the augmented reality unit (8).

9. The safety system (1) according to claim 1, characterized in that the connection module (11) and/or the augmented reality unit (8) has an interface (14) for establishing a data connection with the external unit.

10. The safety system (1) according to claim 1, characterized in that the augmented reality unit (8) is embodied in the form of data goggles.

11. The safety system (1) according to claim 1, characterized in that virtual operating elements are inserted into an image of the surroundings visible through the augmented reality unit (8).

12. The safety system (1) according to any claim 1, characterized in that the virtual operating elements can be set by means of gesture control units.

13. The safety system (1) according to claim 1, characterized in that this is a safety guard locking system.

14. The safety system (1) according to claim 1, characterized in that the connection module (11) constitutes a sub-module of a safety module (2).

15. The safety system (1) according to claim 14, characterized in that connection module (11) can be connected to safety module (2).

* * * * *